Aug. 24, 1965  H. S. MORTON  3,201,978
EFFICIENCY METER
Filed Aug. 27, 1962
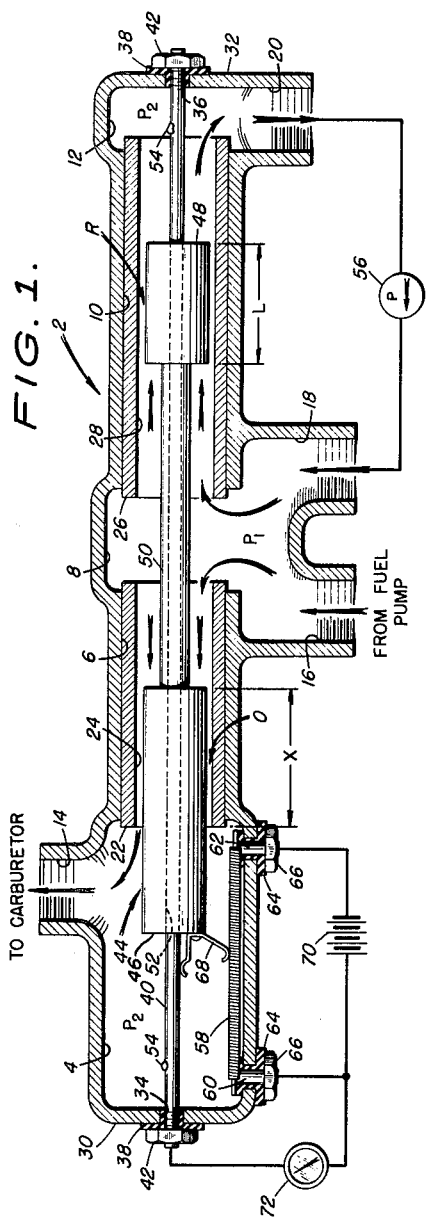
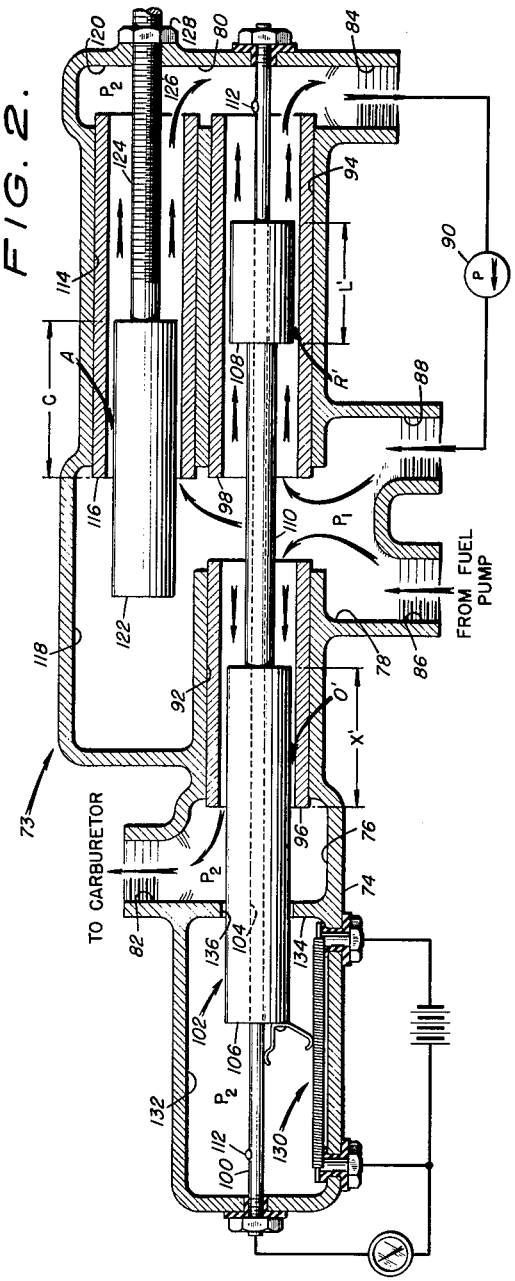
INVENTOR
HAROLD S. MORTON
BY  *Francis B. Francois*
ATTORNEY United States Patent Office 3,201,978
Patented Aug. 24, 1965

3,201,978
EFFICIENCY METER
Harold S. Morton, 7331 Piney Branch Road,
Takoma Park, Md.
Filed Aug. 27, 1962, Ser. No. 219,542
11 Claims. (Cl. 73—114)

This invention relates generally to metering devices for comparing the rate of consumption or expenditure of a liquid input with the useful output resulting from such consumption or expenditure whenever the latter can be measured and expressed in terms of a rate of flow of the same fluid which measures the input; more particularly, it relates to an improved metering device for indicating the operating efficiency of a motor vehicle in miles per gallon rates of fuel consumption, instant by instant during the operation of said vehicle.

For various reasons it is desirable to know at any given instant during the course of their operation the efficiency in terms of miles per gallon of fuel consumed of automobile and like vehicle engines. Numerous devices have been proposed for measuring this operating efficiency, but most have suffered from one or more faults which have rendered them undesirable in actual use.

A common problem with efficiency measuring devices for this purpose has been their inability to compensate for changes in fuel viscosity occurring because of variations in fuel temperature. In some prior meters the device is capable of measuring efficiency accurately at the fuel temperature for which it was designed, but furnishes a reading that is substantially in error for other significantly different fuel temperatures. Because fuel temperature often varies greatly in actual conditions of use, due to weather changes and other factors, an efficiency meter free from the effects of such varying temperature is obviously desirable.

The efficiency meter of the invention compares two rates of fluid flow to obtain directly the operating efficiency of the vehicle engine to which the fuel is being supplied. Because both rates of flow are taken from the same body of fluid, variances in the fuel's temperature and viscosity do not affect the accuracy of the meter. Thus, the problems of past devices associated with both varying temperatures and varying viscosity are overcome.

In addition to eliminating the effects on the accuracy of the meter readings of variations in temperature and viscosity of the fluid flowing through the metering device, the present invention also eliminates the effects on the meter of gravity and of accelerations of the vehicle in any direction. This is accomplished by making the single moving element of the present meter identical in density with that of the fluid in which it is immersed.

The most usual manner for expressing the operating efficiency of a vehicle engine is in terms of the miles per gallon of fuel consumed. It is desirable that an efficiency meter be capable of furnishing readings directly in these terms, and that accurate readings be continuously available during operation of the vehicle. Some past efficiency measuring devices have lacked the first of these two capabilities, and many have lacked the latter. The efficiency meter of the invention possesses both capabilities.

It is, therefore, an object of this invention to provide an efficiency meter capable of continuously determining during its operation the operating efficiency of a fluid fuel engine.

Another object of the present invention is to provide a vehicle engine operating efficiency meter so constructed as to be unaffected by gravitational and acceleration forces acting thereon.

A further object of this invention is to provide a meter for determining the operating efficiency of a fluid fuel vehicle engine, so constructed as to be independent of the temperature and viscosity of the fluid fuel.

It is also an object of the subject invention to provide an operating efficiency meter so constructed as to indicate directly in miles per gallon of fuel consumed the operating efficiency of a vehicle engine.

An even further object of this invention is to provide a vehicle engine operating efficiency meter that is relatively insensitive to sudden pressure disturbances in the flow of fluid therethrough.

Still another object of the present invention is to provide a calibrating device for a vehicle engine operating efficiency meter, so constructed as to permit accurate calibration and adjustment of said meter for operation with any of several different vehicle and engine combinations.

Other objects and many of the attendant advantages of this invention will be readily appreciated as the same become better understood by reference to the following detailed description when considered in connection with the accompanying drawings, wherein:

FIG. 1 is a schematic view in axial section of a first embodiment of the invention; and FIG. 2 is a schematic view similar to FIG. 1 of a second embodiment of the invention, showing the surge damping orifice structure and the meter calibrating plug assembly thereof.

The efficiency meter of the invention utilizes the laminar flow characteristics of fluids, at Reynolds numbers below 2000, for indicating the operating efficiency of a fluid fuel vehicle engine continuously during operation. While the invention will hereinafter be described with reference to a gasoline automobile, it is to be understood that it is not to be limited to such use. The meter of the invention can be readily utilized with engines utilizing fuels other than gasoline, and with vehicles other than automobiles. Moreover, its use is not necessarily limited to vehicle engines, but may extend to industrial power plants and, in appropriate instances, to certain chemical processing equipment where a definite measurable output of material is produced in proportion to a fluid input.

The meter of the invention consists of an elongated housing containing therein two spaced, aligned bores each having a discrete length. A plug is mounted concentrically within said bores for nearly frictionless movement, and includes two identical in diameter, enlarged cylindrical end portions of unequal length connected by a reduced shaft, each cylindrical plug end defining with the wall of its associated bore an annular flow space. A pair of fluid inlets are positioned centrally of the housing between the two spaced bores, one for admitting to the meter fluid passing from the fuel tank to the engine and the other for admitting fluid being recirculated by a positive displacement pump. One end of the housing has a fluid outlet positioned adjacent the end of the cylindrical bore within which the longer of the two enlarged plug ends is disposed, and the opposite end of the housing has an outlet which communicates the other bore with the intake of said recirculating pump.

In operation liquid fuel from the vehicle's supply tank is delivered to the meter, usually by the fuel pump of the engine, at exactly the same rate it leaves the meter on its way to the engine, the fluid being drawn past the longer of the two plug ends as it passes through the meter. When the vehicle is at rest this is the only flow through the meter, and consists only of the fuel being used by an idling engine not moving the vehicle. Under these conditions the entire plug, being freely suspended in the meter, moves as far as it can in the direction of the fluid flow therepast.

As soon as the vehicle begins to move, the recirculating pump, which is activated by motion of the vehicle, commences operation; the pump draws fluid fuel past the shorter end of the plug at a rate proportional to the speed of the vehicle, and returns it to the center of the meter. The flow of fluid past the shorter plug end exerts a force counter to that exerted by the flow of fuel going to the engine past the longer end of the plug, which longer end has only a portion of its length within its enclosing bore in the meter housing. The plug is free to move, and does so until the two forces are perfectly equalized at a plug position determined by the relative rates of fluid flow past the two ends of the plug, one flow being the actual fuel consumed and the other being directly proportional to the vehicle rate of motion which use of the consumed fuel produces.

The position of the plug when the two forces generated by annular fluid flow from the center of the meter toward the ends thereof exactly balance one another is a direct indication of the efficiency, measured in miles per gallon, at any instant. The variation in plug position results from the adjustment of the annular flow passage through which the fuel to be consumed flows by varying the effective length of the longer plug end relative to its surrounding housing bore, said length being varied until the force produced by the flow of fuel to the engine just balances the force resulting from fuel recirculation at a rate proportional to vehicle speed through the fixed in length annular passage between the shorter plug end and its surrounding housing bore. Thus, by measuring the position of the plug at any instant a direct indication of efficiency at that instant in terms of miles per gallon of fuel consumed can be obtained.

Referring now to the embodiment of the invention shown schematically in FIG. 1, a housing is indicated at 2 and includes, in axially aligned relationship, a fuel outlet chamber 4, a first reduced cylindrical chamber 6, an enlarged inlet chamber 4, a second reduced cylindrical chamber 10, and a recirculating fluid outlet chamber 12. An internally threaded fuel outlet 14 communicates chamber 4 with the exterior of the meter, a pair of similarly constructed inlets 16 and 18 are in communication with chamber 8, and a recirculating fluid outlet 20 is in communication with chamber 12. Fitted with chamber 6 is a cylindrical tube 22 having an internal bore 24 which is of uniform diameter throughout its length, a similar tube 26 being fitted within chamber 10 and having a uniform bore 28 therethrough that is identical in diameter with bore 24. The tubes 22 and 26 have the same central axes and are secured within the housing by any suitable means, it being understood that while in the schematic drawing the housing 2 is indicated as being of one piece it would necessarily in an actual embodiment be composed of a plurality of secured together elements, whereby to make possible the assembly of components thereinto. The manner of fabricating such housings from a plurality of elements is well known, and hence is not considered a part of the invention.

The end walls 30 and 32 of the housing 2 have bores 34 and 36 therein, said bores being concentrically disposed about the centerline of tubes 22 and 26. An electrical insulating bushing 38 is positioned within each of said bores, and the opposite threaded ends of a cylindrical support rod 40 extend through said bushings and are secured in position by nuts 42. Mounted on rod 40 is a metering plug 44.

The metering plug 44 includes a relatively long, enlarged cylindrical end portion 46, a relatively short cylindrical end portion 48, and a reduced in diameter connecting shaft 50, and has a cylindrical bore 52 extending completely therethrough of a size to freely receive rod 40, said bore being positioned concentrically within the plug. Suitable bearing means (not shown) are fitted within the opposite ends of the bore 52 whereby to permit the substantially frictionless movement of said plug on said rod.

The plug end portions 46 and 48 have identical diameters, which diameters are somewhat less than the diameters of tube bores 24 and 28 whereby annular flow spaces, or channels, O and R, respectively, are defined between said plug end portions and their respective surrounding tube walls. Typically, the longer end portion 40 is a little more than twice the length of end portion 48, the tube 22 having a length about the same as said end portion 46. The tube 26 is sufficiently long and is so positioned that the entire length, L, of end portion 48 will be contained therein over the entire range of movement of plug 44, which range is limited by stops 54 on rod 40 and extends from a plug position wherein the entire length of tube 22 is occupied by end portion 46 to a position where said plug is shifted to the left and only a small portion of plug end 46 is disposed within said tube 22.

The meter of the invention is dependent for its operation upon the laminar flow characteristics of the fluid flowing therethrough. It is known that in laminar flow of fluids through a pipe, an annular orifice, or other flow channel of uniform cross-sectional area the velocity of the fluid flow is directly proportional to the pressure differential between the two ends of the chamber, and inversely proportional to the length of the flow channel and to the kinematic viscosity of the fluid. The quantity of fluid passing through a channel having laminar flow is directly proportional to the cross-sectional area of said channel and to the pressure differential between the two ends thereof, and inversely proportional to the length of the channel and to the kinematic viscosity of the fluid.

Expressed mathematically, the above relationships are as follows:

$$Q = \frac{k_1 A P}{V l} \qquad (1)$$

where:
$Q$=the rate of fluid flow (gallons/hour);
$A$=the cross-sectional area of the flow channel (in.$^2$);
$P$=the pressure differential between the ends of the flow channel (lbs./in.$^2$);
$l$=the length of the flow channel (in.);
$V$=the kinematic viscosity of the fluid (in.$^2$/hour); and
$k_1$=a constant related to dimensional characteristics of the channel through which laminar flow is occurring.

In the meter of FIG. 1 there are two flow channels both of which are proportioned in the known manner for laminar fluid flow; the annular channel O around plug end 46, through which fuel flows to the carburetor of the engine, and the annular channel R around plug end 48, through which fluid flows to the inlet of a positive displacement, recirculating pump 56 connected with outlet 20. The area of the first channel may conveniently be designed as $A_O$, and that of the second channel as $A_R$. The length of the second channel is designated in the drawing as L, this being a constant value. The length of flow channel O varies as the plug 44 moves, and is designated X in FIG. 1.

Utilizing the designations hereinabove set forth, Equation 1 may now be rewritten for the two channels O and R, as follows:

$$Q_O = \frac{k_O A_O P_O}{V_O X} \qquad (2)$$

$$Q_R = \frac{k_R A_R P_R}{V_R L} \qquad (3)$$

where:

$Q_O$, $Q_R$ = the rates of flow through channels O and R, respectively (gallons/hour);
$A_O$, $A_R$ = the cross-sectional areas of the flow channels O and R, respectively (in.$^2$);
$P_O$, $P_R$ = the pressure differentials between the ends of the flow channels O and R, respectively (lbs./in.$^2$);
$X$, $L$ = the lengths of the flow channels O and R, respectively (in.);
$V_O$, $V_R$ = the respective kinematic viscosities of the fluids flowing through channels O and R (in.$^2$/hour); and
$k_O$, $k_R$ = a constant related to the respective dimensional characteristics of the channels O and R.

The embodiment of the meter shown in FIG. 1 is intended for use with an automobile, and fluid fuel is pumped into said meter through inlet 16 from the automobile's fuel tank by a conventional fuel pump, the volume of fluid flowing into the pump being determined from the power output demands made on the engine; from inlet 16 fuel flows through flow channel O, into chamber 4, and then to the automobile's carburetor through outlet 14. The meter of this invention is intended to indicate the operating efficiency of the automobile in terms of miles per gallon of fuel consumed. The operating efficiency, or fuel economy, in the invention may be expressed mathematically as:

$$E = \frac{S}{Q_{iO}} \qquad (4)$$

where:
$E$ = the automobile's instantaneous operating efficiency (miles/gallon);
$S$ = the value of the automobile's speed at the instant for which E is being determined (miles/hour); and
$Q_{iO}$ = the rate of flow through channel O at the instant for which E is being determined (gallons/hour).

The recirculating pump 56 in the embodiment of FIG. 1 is of the positive displacement type, and is driven from the automobile's road wheels at a rate proportional to the speed of the automobile. The pump 56 may be a gear pump or any other commercially available type, and delivers a definite volume of fluid for each revolution of the automobile's wheels. It is driven by the motion of the automobile through a suitable connection with the wheels thereof, preferably through a take-off from the drive shaft or transmission similar to that utilized for driving the speedometer. The output of the pump is connected to inlet 18, and fluid thus flows from chamber 8, through channel R and into chamber 12, out of said chamber 12 and through pump 56, and thence back into chamber 8. Thus, a recirculating flow is established which is available as a measuring standard.

Referring now to Equation 4, it can be shown that:

$$S = MQ_{iR} \qquad (5)$$

where:
$M$ = the number of traveled miles required to pump one gallon of fuel through channel R (miles); and
$Q_{iR}$ = the rate of flow through channel R at the instant for which S is being determined (gallons/hour).

For any given desired instant, it can be demonstrated that:

$$Q_{iO} = Q_O \qquad (6)$$
$$Q_{iR} = Q_R \qquad (7)$$

Substituting into Equation 4 the relationships of Equations 2, 3, 5, 6 and 7, it is now apparent that:

$$E = \frac{S}{Q_{iO}} = M\frac{Q_{iR}}{Q_{iO}} = M\frac{k_R A_R P_R V_O X}{k_O A_O P_O V_R L} \qquad (8)$$

Referring now to FIG. 1, it is seen that because the bores 24 and 28 are of the same diameter, as are the plug ends 46 and 48, the cross-sectional area of flow channels O and R are identical. Thus, $$A_R = A_O \qquad (9)$$

Fluid entering into chamber 8 has a pressure which in the drawing is indicated as $P_1$. The fluid at a pressure $P_1$ flows through channels O and R into the chambers 4 and 12, within which chambers the fluid pressures are obviously at lower levels than in the chamber 8 because of losses incurred in flowing through said channels. Because the plug 44 is free to move, if the pressure within chamber 4 should vary in the slightest from the pressure in chamber 12 the plug will shift until the pressures in said chambers are equal. It is thus evident that once plug 44 has shifted pressures in chambers 4 and 12 are identical, which pressures are identified as $P_2$ in FIG. 1. From this relationship it is apparent that:

$$P_R = P_1 - P_2 \qquad (10)$$
$$P_O = P_1 - P_2 \qquad (11)$$

The kinematic viscosity of a fluid is known to vary with the temperature thereof. This variation of viscosity with temperature creates, as described hereinabove, an accuracy problem when two separate bodies of fluid are being compared. In the instant invention, however, the fluids flowing through both channel R and channel O are from the same body of fluid; thus, they have the same temperature and kinematic viscosity. Therefore, it is seen that:

$$V_O = V_R \qquad (12)$$

As has already been specified, the two flow channels O and R are identical in dimensional characteristics. This establishes the following relationship:

$$k_R = k_O \qquad (13)$$

Substituting the relationships of Equations 9, 10, 11, 12 and 13 into Equation 8, and cancelling where appropriate, it is now seen that:

$$E = M\frac{X}{L} \qquad (14)$$

From Equation 14 it is seen that for the meter shown in FIG. 1 the operating efficiency, or fuel economy, of an automobile engine with which the invention is utilized is proportional to the ratio of the variable length X to the fixed length L, multiplied by the constant M. Because of the construction of the meter such variables as fuel temperature and viscosity are immaterial, the advantages to be gained thereby being readily apparent.

The constant M, which for use with an automobile is defined as the number of traveled miles required to pump one gallon of fuel through the annular channel R, should be chosen so that the highest E that the automobile can obtain will not exceed the maximum value of X resulting when the plug moves as far to the right as is possible. Thus, by utilizing various values for M the meter of FIG. 1 can be employed with engines of varying operating efficiencies.

As has been described, the pump 56 is of the positive displacement type, and for use in an automobile it is conventionally connected into the power train so that each revolution of the automobile's driving wheels will pump a specific volume of fluid through channel R. The value for M is thus directly dependent upon the capacity of the pump 56, and on the number of revolutions, or cycles, it completes per mile traveled. Correlations between the value of M and an expected range for values of E are best made by choosing a value for M which gives a midscale E reading. A midscale reading occurs when X and L are of equal length, in which instance, from Equation 14:

$$E = M \qquad (15)$$

Thus, from Equation 15 it is apparent that if a midscale E reading of, say, 12 miles per gallon is desired, then a pump 56 should be chosen which will deliver one gallon of gasoline through the channel R for each 12 miles of automobile travel. Proper values of pump capacity, and revolutions thereof per mile established in the gearing connecting the pump to the automobile power train, can give this or any other desired value for M.

Thus, with a fixed value for M, properly chosen for the expected range of E values, the value for E at any given instant can be readily determined from Equation 14 by the ratio of X to L. Since the value of L is a constant, the only variable in Equation 14 for a given M is X. If the value of X is known, therefore, the value for E can be readily calculated.

In operation, fuel is admitted into the meter through inlet 16 and enters chamber 8. A portion thereof flows through channel O to chamber 4 and thence, in automotive use, to the engine's carburetor through outlet 14. Assuming that the automobile is initially at a standstill and that pump 56 is therefore idle, there will be no fuel flowing through channel R, and consequently plug 44 will be moved as far to the left as is possible.

As the automobile moves, and pump 56 commences to operate, it will draw fuel from chamber 8 through channel R, causing a momentary pressure differential between chambers 4 and 12. Plug 44 immediately moves to compensate for this pressure differential, stopping only when the pressures in chambers 4 and 12 are equal. The length X is then a measure of the instantaneous operating efficiency of the engine at that particular automobile speed, and for that particular rate of fuel flow.

As the fuel demands of the engine increase, or as the miles traveled per hour by the automobile vary, pressure differentials will occur between the ends of plug 44. The plug always moves instantly to compensate for these changes, causing length X to change and thus furnishing an indication of a new value for E for the new operating conditions. Thus, by constantly knowing the value of X it is possible to obtain a value for E at each instant during the operation of the engine. This value for X can be readily determined by measuring the distance which the piston 44 moves from the position it assumes when E approaches zero, i.e., when the plug 44 is as far to the left as is possible.

The movement of the plug 44 can be measured in any of a variety of manners. In the device shown in FIG. 1, however, plug movement is measured by a potentiometer arrangement, and values for X are either read directly or are automatically converted directly into E values.

Referring to FIG. 1, a linear potentiometer winding 58 is shown disposed within chamber 4, the winding being supported by a pair of threaded terminal posts 60 and 62, one at each end thereof. The posts 60 and 62 pass through openings in the housing 2, the openings each having electrical insulating elements 64 fitted therein, and are secured by nuts 66. A potentiometer slide 68 is secured to the end face of plug 44, and includes a pair of resilient contact arms, one of which rides on the winding 58 and the other of which rides on rod 40, said rod being constructed of a conductive material and serving as an electrical conduit for the potentiometer.

A source of electrical current 70 is connected between the two terminal posts 60 and 62, and an ammeter 72 is connected between rod 40 and the terminal post 60. Thus, movement of plug 44 causes slide 68 to move along winding 58, causing a change in the resistance of the circuit and hence in the value of the current flowing therethrough. The electric current values for each position of plug 44, and hence for each value of X, are indicated on meter 72, which may be calibrated either in units of length or directly in values for E.

The slide 68 may tend to create a small friction drag force which tends to slightly impede the movement of plug 44. However, in most applications for the invention, and especially for automotive use, the meter will be positioned in close proximity to the engine whose efficiency it is measuring. The constant vibration normally inherent in engine operation will thus be transmitted to the meter, and will tend to reduce the drag effect of slide 68 and aid the plug 44 to move freely in response to changes in flow conditions.

The movement of plug 44 might be expected to be affected by acceleration effects on the meter, this problem being especially present in automotive application. However, in the construction of the invention this potential source of reading error is eliminated by making the plug so that it has a density identical with the mean density of the fluid flowing through the meter and in which the plug is immersed. This matching of densities can be obtained by proper selection of the material for the plug, and if necessary by hollowing out portions thereof. The result of utilizing identical densities is that neither gravitational nor acceleration forces can exist to cause motion of the plug relative to the fluid surrounding it.

As has been described, the meter of FIG. 1 can be adjusted to measure a variety of ranges of values for E, it only being necessary to vary the value of the constant M for each range of values by changing either the size of the pump 56 or the driving gear therefor. However, it is obvious that such changes are somewhat involved mechanically, and that consequently the meter of FIG. 1 is not as flexible as might be desired for easy installation on a variety of different automobiles, for example, each of which might have a different range of values for E. Further, the construction of FIG. 1 does not permit fine calibrating adjustments to adjust the recirculating fluid flow rate for accurate correlation with any specific set of scalar values for E. A second embodiment of the invention is therefore illustrated in FIG. 2 which overcomes these somewhat undesirable characteristics of the simplified construction of FIG. 1.

Referring to FIG. 2, a meter for use with automotive vehicles and the like is indicated at 73, and includes a housing 74 having therein an outlet chamber 76, an inlet chamber 78, and a recirculating fluid outlet chamber 80. The two outlet chambers 76 and 80 have threaded outlets 82 and 84, respectively, in communication therewith, and a pair of threaded inlets 86 and 88, connected with a fuel pump and the outlet of a positive displacement type recirculating fluid pump 90, respectively, are in communication with inlet chamber 78. The outlet 84 is connected to the inlet of pump 90, and said pump is suitably connected in the same manner as pump 56 to the power train of the vehicle on which the meter is installed.

The housing 74 has therein a pair of aligned cylindrical bores 92 and 94, within which are respectively secured spaced apart tubular conduits 96 and 98 having identical internal diameters. A rod 100, similar in construction to and mounted in the same manner as rod 40, extends concentrically through conduits 96 and 98, and a plug 102 having a central bore 104 therethrough is carried by said rod.

The plug 102 includes a pair of spaced end portions 106 and 108 having identical, relatively large diameters, and a central, reduced in diameter connecting shaft 110. A pair of detents 112 on rod 100 limit the movement of plug 102, and the dimensional relationships of the latter with regard to the tubes 96 and 98 are the same as the like relationships between plug 44 and its associated conduits 22 and 26. The plug end portions 106 and conduit 96 define therebetween an annular flow channel O', which is identical in area to an annular flow channel R' defined between plug end portion 108 and the tubular conduit 98. The structure thus far described is similar in construction and principal of operation to the corresponding components of the embodiment illustrated in FIG. 1.

The housing 74 also includes a cylindrical bore 114 positioned parallel to bore 94, the two bores being of like length and having their ends lying in common planes. A tubular conduit 116 having an internal diameter identical to that of the conduits 96 and 98 is secured within said bore, and communicates at its opposite ends with chambers 118 and 120 in the housing. The chambers 118 and 120 in turn are in communication with inlet chamber 78 and the recirculating fluid outlet chamber 80, respectively, so that fluid recirculated by the pump 90 flows in parallel through both conduit 116.

A cylindrical calibrating plug 122, having an external diameter identical to that of the metering plug end portions 106 and 108, is supported concentrically within tube 116 by a threaded shaft 124 rigidly attached thereto, said shaft projecting through a threaded bore 126 in the end wall of the housing 74 and being locked in position by a lock nut 126. Thus, a third annular flow channel A is defined between the plug 122 and tube 116, said channel having a cross-sectional area identical to that of the channels O' and R'. The length of the channel A, indicated in the drawing by the dimension C, can thus be precisely varied merely by first releasing lock nut 128 and then rotating shaft 124.

An examination of FIG. 2 will reveal that when the pump 90 is operating the same fluid, at the same temperature and with the same viscosity, flows in parallel through both the channels R' and A. Further, the flow rates through the lengths L' and C in FIG. 2 will be inversely related to these lengths, and the same pressure differential between the ends thereof will exist for both channels.

From Equation 14 it is known that:

$$E = M\frac{X}{L} \quad (14)$$

In the device of FIG. 2 it is apparent that the length of the constant flow channel includes both the length C and the length L'. Thus, for the meter 73 Equation 14 may be rewritten as:

$$E_2 = M_2\left(\frac{X'}{L'} + \frac{X'}{C}\right) \quad (16)$$

where:

$E_2$ = the instantaneous operating efficiency for the meter embodiment shown in FIG. 2 (miles/gallon);
$M_2$ = the number of travelled miles required for pump 90 to pump one gallon of fuel through channels R' and A (miles);
$X'$ = the length of the flow channel O' (in.);
$L'$ = the fixed length of flow channel R' (in.); and
$C$ = the length of the flow channel A (in.).

As has been herein above described, the meter of the invention is best calibrated when it is reading at midscale, with the length of the two flow channels around the metering plug being identical. This relationship for the embodiment of FIG. 2, based on Equation 16, may be expressed as:

$$E_2 = M_2\left(1 + \frac{L'}{C}\right) \quad (17)$$

Rearranging and inverting Equation 17, it can be shown that:

$$C = L'\frac{M_2}{E_2 - M_2} \quad (18)$$

From Equation 17, it is readily seen that for any given pump 90 having a fixed value for $M_2$, the value of $E_2$ may be easily correlated over a wide range merely by adjusting the length C of the flow channel A. Thus, the same meter 73 and pump 90 can be installed on any one of a number of automobiles or the like, and may be correlated to the expected range of $E_2$ values thereof merely by adjusting the calibrating plug 122.

The desired setting for the calibrating plug for any specific $M_2$ at any desired scale reading $E_2$ at which X' equals L' is easily obtainable from Equation 18, it only being necessary that $M_2$ be less than the value of $E_2$ when X' and L' are equal.

The operation of the meter 73, once calibrating plug 122 has been properly adjusted, is substantially the same as described for the meter shown in FIG. 1.

Values for $E_2$ are indicated by the length X', which is measured in the meter 73 by a potentiometer arrangement 130 identical in construction and operation to the potentiometer arrangement utilized for measuring the length X in FIG. 1.

When the meter of FIG. 1 is utilized in an automobile, with the outlet 14 connected to the fuel inlet or carburetor of the automobile's engine, the flow within chamber 4 and through channel O may be caused to pulsate because of a chattering action on the part of the carburetor's float. When this condition, which may also happen in other situations, occurs, the metering plug 44 tends to oscillate rapidly back and forth in a jerking movement. This undesirable effect is substantially eliminated in the meter of FIG. 2.

Referring again to FIG. 2, the housing 74 is seen to include a chamber 132 in alignment with chamber 76 and within which is mounted the potentiometer winding of the assembly 130. A wall 134 separates the chambers 132 and 76, and has a circular opening 136 therein in alignment with the tube 96. The plug end portion 106 is of sufficient length to extend through the opening 136 and into the chamber 132 even when the plug is shifted to the right as far as is possible, and the diameter of the opening 136 is slightly greater than that of said piston end portion whereby to define a damping orifice.

As is apparent, it is the effect of pressures $P_2$ acting on the ends of the plug that cause it to move. The pressure $P_2$ acting on the left end of the plug is that of the fluid contained in damping chamber 132, which fluid must move into and out of said chamber through the damping orifice defined by the opening 136. Under relatively slow changes in fluid pressure the pressures within chambers 76 and 132 quickly equalize. However, any rapid pressure changes which might cause the plug 106 to chatter are damped out by the resistance offered to rapid fluid flow by the damping orifice; thus, the plug 106 is not subject to oscillations caused by rapidly pulsating flow in outlet chamber 76.

In the event the damping orifice is not sufficiently effective in controlling the effects of plusating fluid flow, this invention also contemplates other means for stabilizing the rate of fluid flow from outlet chamber 76. For example, a closed plastic bag enclosing air or an inert gas may be disposed in the flow path from the meter to the carburetor. All flow equalizing devices must be sparingly utilized, however, lest short duration changes in actual miles per gallon rates be smoothed over and not be recognized and reported by the meter. The extent of their proper use will depend on how much pulsation characterizes the flow rate to any particular carburetor.

Obviously, the flow damping device of FIG. 2 may also be utilized with the meter of FIG. 1. In addition, it must be remembered that the drawings are only schematic, and that the other possible arrangements of the components of the invention are possible within the teachings hereinabove presented.

As has been mentioned hereinabove, while the invention has been thus far described with relationship to gasoline or similar fluid fuel operated motor vehicles, it should not be considered as being limited to such use. Further, the meter may be utilized in situations where the normal working fluid is unsuitable for the meter because of its viscosity or some other reason, or where no working fluid is normally available; in either of these instances the meter is supplied with a suitable working fluid, one portion of which is pumped through the adjustable flow channel at a rate proportional to the input of a device, and another portion of which is recirculated through the other flow channel by a recirculating pump connected to the output of said device.

By way of example only, the manner in which the invention may be utilized with a device where no working fluid is available will be described in connection with a battery powered, electric motor propelled vehicle. Such a vehicle normally includes a plurality of batteries, all connected through a control circuit to individual electric motors mounted on two or more of the vehicle's wheels.

For use with such a vehicle the inlet 16 of the meter shown in FIG. 1 would be connected through a fluid pump to a fluid reservoir. The reservoir would contain a working fluid of a suitable viscosity, and the fluid pump would be connected with the control circuitry of the electric vehicle to pump said fluid into the meter at a rate proportional to the amount of electric power supplied to the motors. In this instance, the fluid outlet 14 would merely be connected to return the working fluid to said reservoir.

The recirculating pump 56 would again be connected to the vehicle wheels so that it operates at a rate proportional to the forward travel of the vehicle. Thus, a portion of the working fluid would be recirculated through channel R at a rate proportional to the mileage traveled. The position of the metering plug 44 will thus indicate the efficiency of the electric vehicle in terms of miles per watt, or some other suitable comparative basis.

Obviously, many modifications and variations of the present invention are possible in the light of the above teachings. It is therefore to be understood that within the scope of the appended claims the invention may be practiced otherwise than as specifically described.

What is claimed is:

1. An efficiency meter for continuously comparing and indicating the ratio between two rates of fluid flow, one of said fluid flow rates being proportional to the input of an apparatus and the other of said fluid flow rates being proportional to the output of said apparatus, comprising a housing, a pair of aligned, spaced bores within said housing, a plug member including a relatively long end portion, a relatively short end portion, and a shaft portion of smaller diameter than and connecting said end portions, said end portions being of smaller diameter than said bores and each being disposed within one of said bores for translational movement with respect thereto, said long end portion and its associated bore defining a flow channel which varies in length as said plug member is translated, and said short end portion and its associated bore defining a flow channel which maintains a fixed length as said plug member is translated, and said housing having an inlet port means positioned between and in communication with both of said bores, and a pair of outlet ports, one at the end of each bore remote from said inlet, whereby when fluid flowing at said input flow rate passes from said inlet through said variable channel and fluid flowing at said output flow rate passes from said inlet through said fixed channel said plug member will be translated in response to differential fluid pressure until the forces exerted thereon by said two fluid flows balance, the length of said variable length flow channel then being an indication of said ratio.

2. An efficiency meter as recited in claim 1, including additionally means connected to said housing for measuring and remotely indicating the length of said variable flow channel.

3. An efficiency meter as recited in claim 1, including additionally means in said housing defining a third, adjustable in length flow channel, said third flow channel being arranged in parallel with said fixed length flow channel for calibrating said meter.

4. An efficiency meter as recited in claim 1 including additionally means attached to said housing and associated with said plug for damping rapid changes in said rates of fluid flow.

5. An efficiency meter apparatus for continuously measuring the operating efficiency of a motor vehicle having a fluid fuel engine, including a housing having an inlet port means therein connected with a source of fluid fuel, and a pair of flow channels in communication at one end thereof with said inlet means, the other end of one of said flow channels being in communication with the fuel inlet of said engine, means connected with said housing inlet port means and the other end of the other of said flow channels for recirculating fluid fuel through said other flow channel at a rate proportional to the instantaneous speed of said vehicle, fluid pressure responsive means in said housing for comparing and indicating the ratio of said recirculating fluid fuel flow to the fluid fuel flow through said one flow channel, whereby to measure the operating efficiency of said vehicle, and means in said housing for adjusting said meter for use with engines having various ranges of operating efficiency values, said adjusting means including means in said housing defining an adjustable in length flow channel, arranged in parallel with said other flow channel.

6. An efficiency meter apparatus for continuously measuring and indicating the operating efficiency of a motor vehicle having a fluid fuel engine, including a housing having a pair of spaced, aligned bores therein of identical cross-sectional area, said housing also having a pair of inlet ports positioned between and in communication with said spaced bores, and a pair of outlet ports, one at the end of each said bore remote from said inlet ports, a metering plug, including a pair of identical in cross-sectional area end portions and a connecting shaft having a smaller cross-sectional area than said end portions, one of said end portions being substantially longer than the other thereof and both of said end portions being substantially smaller in cross-sectional area than said bores, means for mounting said plug concentrically within said bores for translational movement, the longer plug end being received within one of said bores and defining therewith a variable length flow channel and the shorter plug end being received within the other of said bores and defining therewith a fixed length flow channel, one of said inlet ports being connected with a source of fluid fuel and the outlet port associated with said variable length flow channel being connected with the fuel inlet of said engine, pump means connected between the other of said inlet ports and the other outlet port and arranged to recirculate a portion of said fluid fuel through said fixed flow channel at a rate proportional to the instantaneous speed of said vehicle, and means connected to said housing for measuring and remotely indicating the length of said variable flow channel.

7. An efficiency meter apparatus as recited in claim 6, including additionally orifice means in said housing and arranged to cooperate with said plug for damping sudden changes in the pressure of fluid flowing therethrough.

8. An efficiency meter apparatus as recited in claim 6, including additionally an adjustable in length calibration flow channel in said housing arranged in parallel with said fixed flow channel.

9. An efficiency meter apparatus as recited in claim 8, wherein said calibration flow channel has a cross-sectional area identical to that of said fixed flow channel.

10. An efficiency meter apparatus as recited in claim 6, wherein said last mentioned means includes a potentiometer mounted within said housing and connected with said plug.

11. An efficiency meter apparatus as recited in claim 6, wherein said metering plug has a density substantially identical to the mean density of the fluid flowing through said meter apparatus.

References Cited by the Examiner

UNITED STATES PATENTS 2,587,701  3/52  Davis _____ 73—114
2,647,402  2/53  Ibbott _____ 73—210

RICHARD C. QUEISSER, *Primary Examiner.*